United States Patent
Teng

(10) Patent No.: US 6,295,537 B1
(45) Date of Patent: Sep. 25, 2001

(54) USER'S DATABASE IN NETWORKS AND METHOD OF CONSTRUCTING THE SAME

(75) Inventor: Wei-Yang Teng, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 0 days.

(21) Appl. No.: 09/120,200

(22) Filed: Jul. 22, 1998

(30) Foreign Application Priority Data

Jan. 19, 1998 (TW) .................................. 87100622

(51) Int. Cl.[7] .............................. G06F 7/00; G06F 17/00
(52) U.S. Cl. ..................... 707/100; 707/101; 707/102; 707/203; 711/200; 711/216; 711/221; 709/219
(58) Field of Search ............................. 707/100, 10, 101, 707/102, 202; 709/203, 217, 219; 711/200, 221, 216, 111

(56) References Cited

U.S. PATENT DOCUMENTS

| | | | |
|---|---|---|---|
| 4,366,551 | * | 12/1982 | Holtz .................................. 364/900 |
| 4,945,475 | * | 7/1990 | Bruffey et al. ...................... 364/200 |
| 5,519,858 | * | 5/1996 | Walton et al. ...................... 395/600 |
| 5,542,087 | * | 7/1996 | Neimat et al. ...................... 395/600 |
| 5,742,611 | * | 4/1998 | Brandin ............................... 370/473 |
| 5,870,764 | * | 2/1999 | Lo et al. ............................. 707/203 |

* cited by examiner

*Primary Examiner*—Thomas Black
*Assistant Examiner*—Jacques Veillard
(74) *Attorney, Agent, or Firm*—Sughrue, Mion, Zinn, Macpeak & Seas, PLLC

(57) ABSTRACT

The present invention relates to a user's database structure in the network and a method of constructing the same, in particular, to a user's database structure and a method of constructing the same in Ethernet. The structure comprises a set of bytes having a plurality of fields, a main storage layer having the set of bytes, a plurality of sub-storage layers having the set of bytes, a plurality of main connection lines and sub-connection lines, to form a database of tree structure. For retrieval of the user's address data, only the main storage layer, the main connection line and sub-connection lines, and the last sub-storage layer are required to retrieve a user's address data so as to save the storage space occupied by the database.

11 Claims, 4 Drawing Sheets

USER'S DATABASE IN NETWORKS AND METHOD OF CONSTRUCTING THE SAME

BACKGROUND OF THE INVENTION

1. Field of the Invention

The present invention relates to a user's database structure and a method of constructing the same, in particular, to a user's database of tree structure used in Ethernet.

2. Prior Art

In the simple network management protocol (SNMP) and remote monitoring (RMON) system, the user's address data is mapped after Hash Algorithm to the user's database for storage. Thus, for retrieval of the address data from the database, the database must be accessed to locate the user's address data by means of Hash algorithm. As shown in FIG. 1, which depicts the storage status in the conventional user's database. As shown in FIG. 1, the user's database has four layers of storage space. A first user's data is registered in the "O" th layer of storage space 1. After calculation with Hash algorithm, the user's identification (ID) is placed at the user terminal 11. The data of a second user is also first processed at the "O" th layer of storage space 1 with the corresponding Hash algorithm. However, after calculation, the data of the second user will collide with that of the first user. Therefore, calculation with Hash algorithm must be performed for the second time in the first layer of storage space 2. The ID of the second registered user is placed in the user terminal 21 of the first layer of storage space 2. Similarly, whenever a new user is registered, Hash algorithm calculation must begin with the "O" th registered layer of storage space 1. If any collision happens, it is required to move to the next storage space and Hash algorithm calculation is repeatedly performed until available storage space can be located. Hence, the ID of the third registered user is placed in the user terminal 31 in the second layer of storage space. Since a server 41 is the last one to be registered and collision happens among the "O" th through the second layer of storage space, the ID of the server 41 is placed in the third layer of storage space 41. Hence, when collision happens between the calculated addresses, data will be lost and lacks accuracy. Besides, in storage or retrieval of data, due to the random variation in user's address, the required time cannot be efficiently controlled.

SUMMARY OF THE INVENTION

The object of the present invention is to provide a user's database for Ethernet. The database comprises a main storage layer having a plurality of fields; a plurality of sub-storage layers having the plurality of fields; a main connection line for connecting said main storage layer to said sub-storage layers; and a sub-connection line among sub-storage layers, to form a database of tree structure. In address search, only the main storage layer, main connection line and sub-connection lines and the last sub-storage layer are required to retrieve a user's address. In the transmission of information in the network, correct user's information can be accurately retrieved to increase the efficiency of the network and also to save the storage space with lower material cost.

The contents and technique of the present invention can be described in detail with the company of the following drawings:

DETAILED DESCRIPTION OF THE INVENTION

Figure 1:
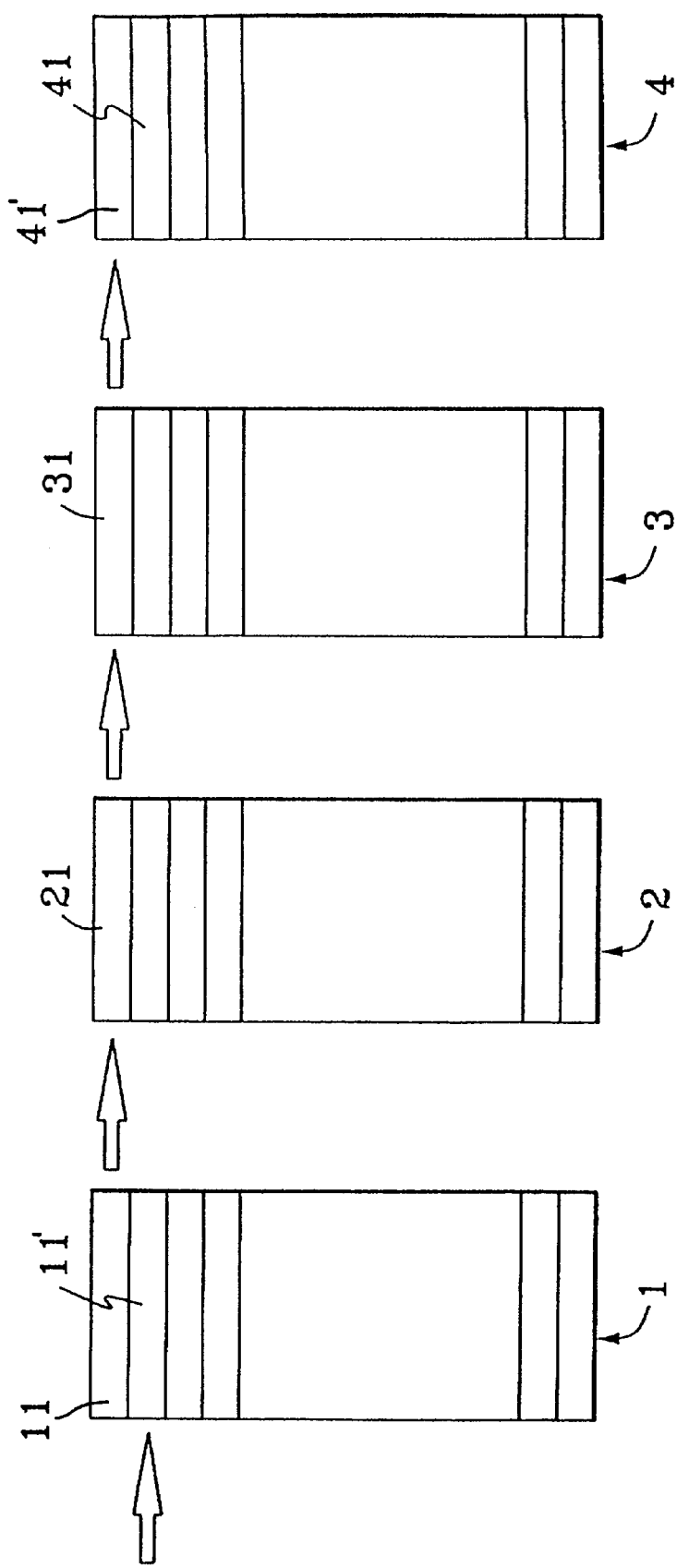
FIG. 1 is a schematic diagram for the storage status a user's address in a conventional user's database.
Figure 2:
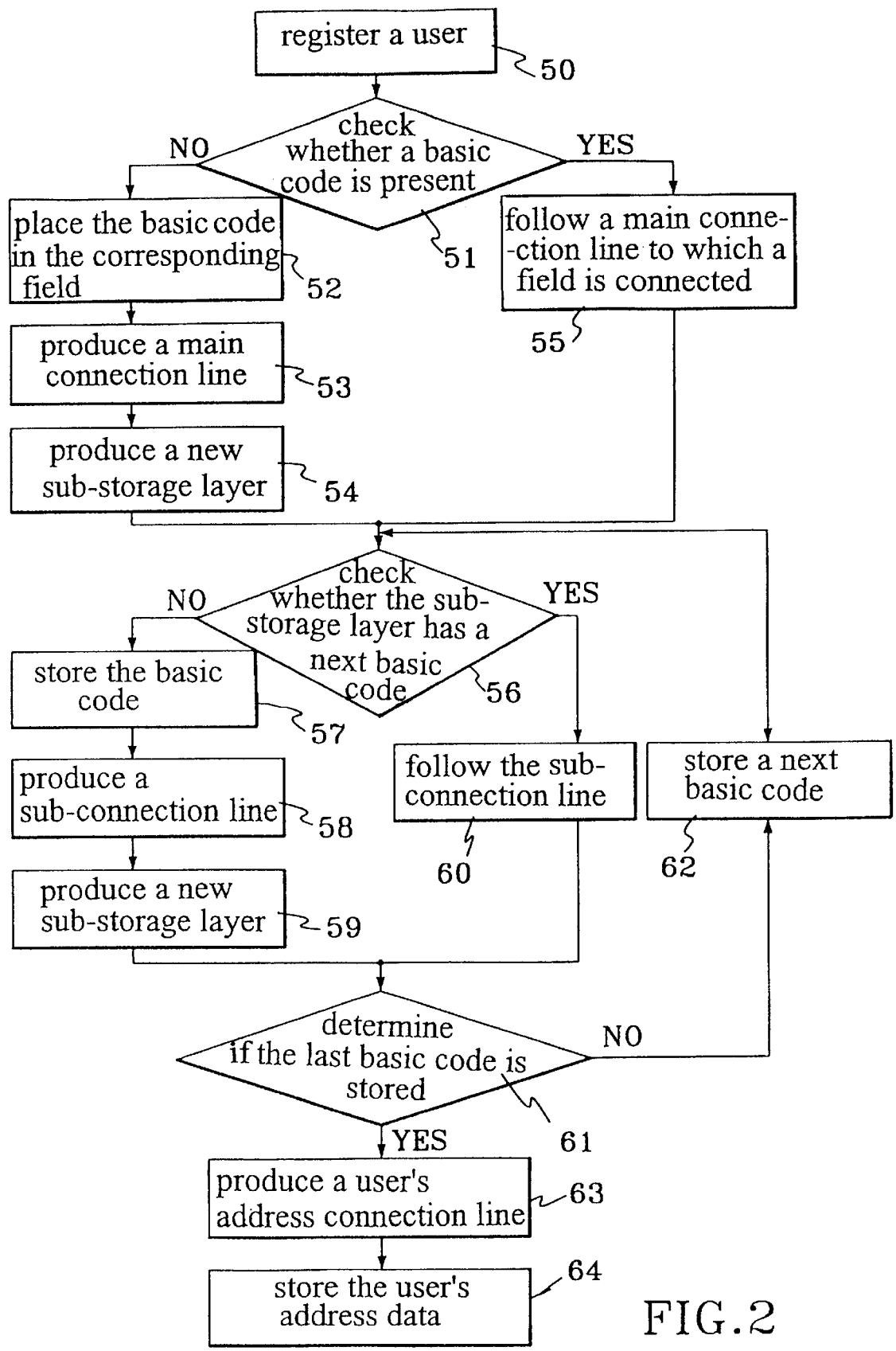
FIG. 2 is a flowchart for a user's database of the present invention.

Referring to FIG. 2 showing a user's database setup flowchart of the present invention, in step 50, the presence of a newly registered user will be identified through information exchange in the network by a network managing agent. In step 51, the agent can start from a layer in the main storage layer of his database to check whether a basic code identical to the first bit of the address data is present. If not, in step 52, the basic code will be placed in the corresponding field of the main storage layer. In step 53, a main connection line is produced and in step 54, a new sub-storage layer linked to the main connection line is produced. Otherwise, in step 55, a main connection line to which a field is connected is followed up until the sub-storage layer is reached. In step 56, check whether the sub-storage layer has a next basic code of the user's address data. If not, in step 57, the basic code is stored in the corresponding field of the sub-storage layer. In step 58, a sub-connection line is produced from the corresponding field and in step 59 a new sub-storage layer connected to the sub-connection line is produced. Otherwise, in step 60, the sub-connection line to which the field is connected is followed up until another sub-storage layer is reached. In step 61, decide whether the last basic code of the address data is stored. If not, in step 62, prepare the storage of a next basic code and return to step 56 until all basic codes of the user's address data have been stored in the database. Otherwise, in step 63, according to the field at which a user's last basic code is placed, a user's address connection line connected to the field of the user's address is produced. In step 64, the user's address data is stored in the field of the user's address. Thus, the address data of the newly registered user can be stored in the database of the network.

Figure 3:
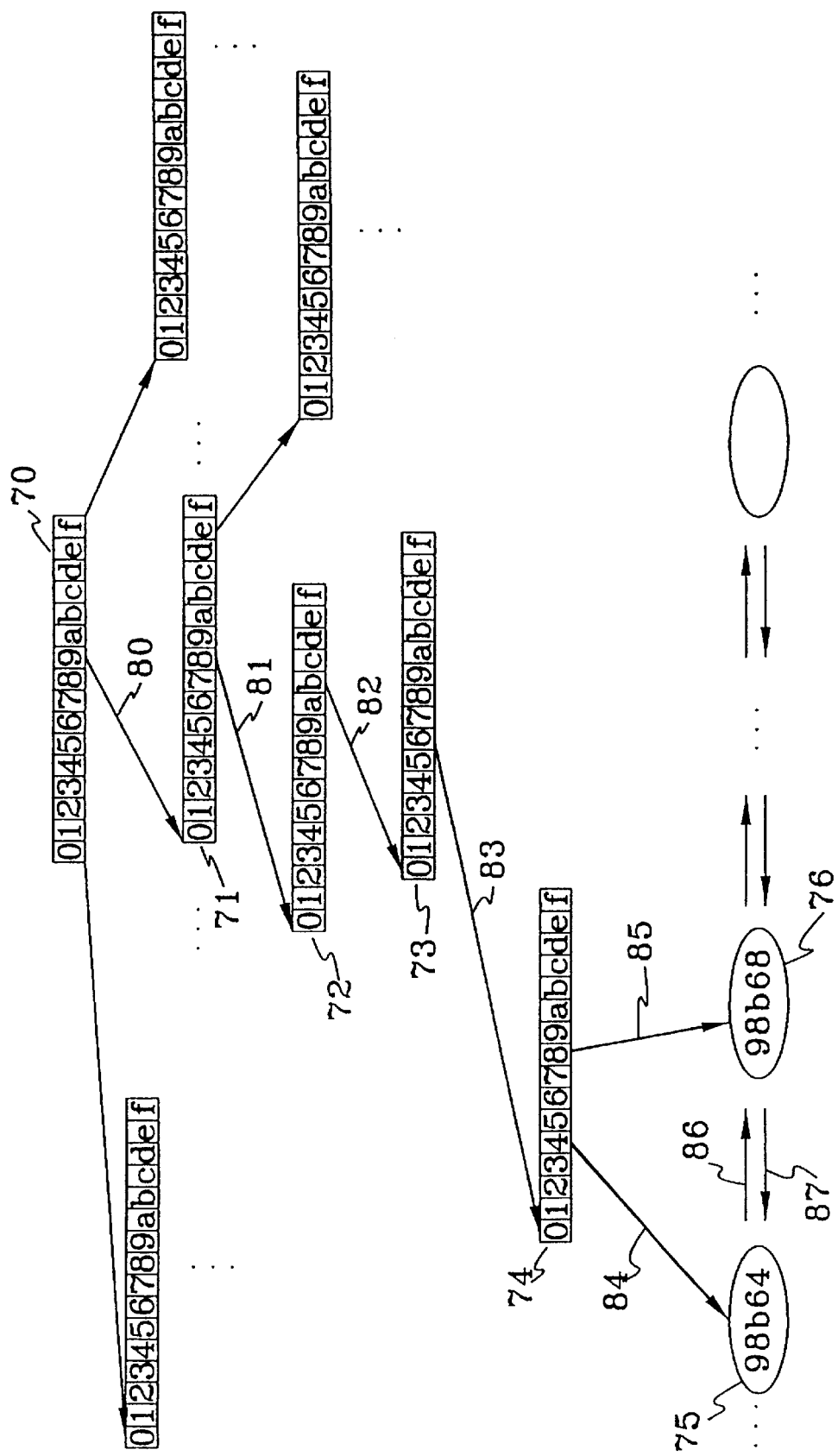
FIG. 3 is a schematic diagram for a structure of user's network database of the present invention.

By means of the above database setup procedure, the tree structure of the user's database can be completely established. As shown in FIG. 3, which is a schematic diagram of an embodiment of the user's database of the present invention, the database comprises a main storage layer 70, a first sub-storage layer 71, a second sub-storage layer 72, a third sub-storage layer 73, a fourth sub-storage layer 74, a user's address field 75, a main connection line 80 for linking the main storage layer with the first sub-storage layer, a first sub-connection line 81, a second sub-connection line 82, a third sub-connection line 83, a first user's address connection line 84 and a second user's address connection line 85. The first to third sub-connection lines 81, 82, and 83 are used for linking the sub-storage layers. Thus, storing five bits of user's address data "98b64" and "98b68" by means of the database setup flowchart shown in FIG. 2 begins with the main storage layer 70, along the main connection line 80 and sub-connection lines 81, 82 and 83, to the last sub-storage layer, and then via the first and second user's connection lines 84 and 85, the above five bits of the user's address can be stored in the fields 75 and 76 of the user's address. Between the fields 75 and 76, searching pointers 86 and 87 are produced to enable the search for previous or next user's address data from the present field of the user's address.

Figure 4:
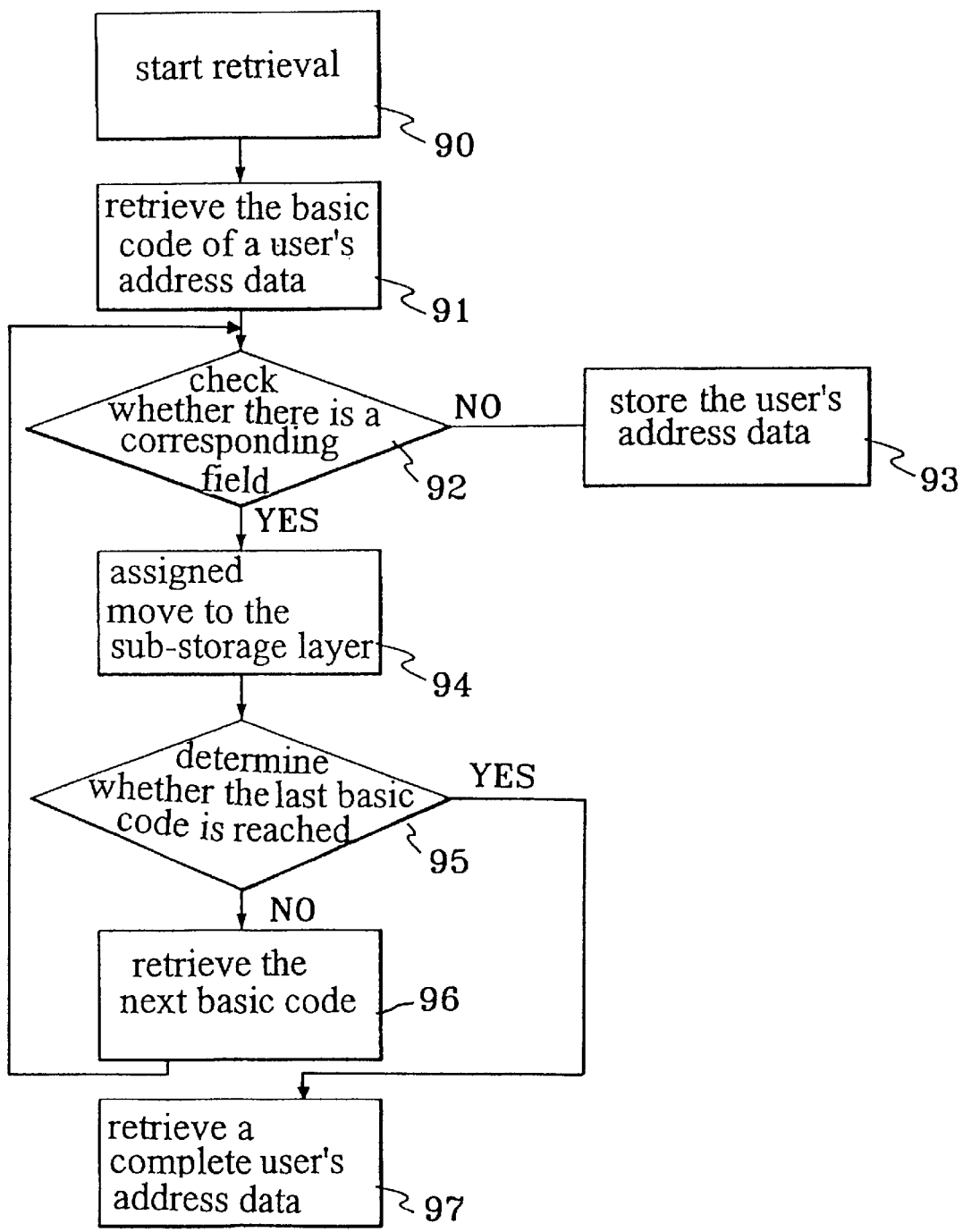
FIG. 4 is a schematic diagram for retrieval of data in the user's network database of the present invention.

Referring to FIG. 4, which shows data retrieval flowchart of the present invention, in step 90, the retrieval starts in the system from the main storage layer. In step 91, the first basic code of the user's address data is retrieved. In step 92, check whether there is a field corresponding to the first basic code. If not, in step 93, the user's address data is stored, i.e., based on the database setup flowchart shown in FIG. 2 to store the user's address data. Otherwise, in step 94, move from the field of the basic code along the connection line to the assigned sub-storage layer 94. Subsequently, in step 95, decide whether the last basic code of the address data has been reached. If not, in step 96, retrieve the next basic code. Otherwise, in step 97, according to the field of the user's address, the complete user's address data is retrieved.

In summarizing above description, in addition to the example given in FIG. 3, the user's database structure of the present invention in the network can be expanded according to the number of the bits in the user's address data. The database structure of the present invention can be implemented in integrated circuit modules.

Brief Description of the Reference Numbers

1 "0"th storage space
  11 User's terminal
  11' Server
2 First storage space
  21 User's terminal
3 Second storage space
  31 User's terminal
4 Fourth storage space
  41 Server
  41' User's terminal
50 Newly registered user
51 Check whether the main storage layer has a basic code identical to the first bit of the address data.
52 Store the basic code in the corresponding field of the main storage layer.
53 Produce a main connection line from that field.
54 Produce a new sub-storage layer connected to main connection line.
55 Follow the main connection line of the field to the sub-storage layer connected thereto.
56 Check whether the sub-storage layer has a next basic code of the user's address data.
57 Store the basic code in the corresponding field of the sub-storage layer.
58 Produce a sub-connection line from the field.
59 Produce a new sub-storage layer connected to the sub-connection line.
60 Follow the sub-connection line of the field to the sub-storage layer connected.
61 Determine whether the last basic code of the address data has been stored.
62 Prepare to store the next basic code.
63 According to the field of the last basic code of the user's address data, produce a user's address connection line connected to the field of the user's address.
64 Store user's address data in the field of the user's address.
70 Main storage layer
71 First sub-storage layer
72 Second sub-storage layer
73 Third sub-storage layer
74 Fourth sub-storage layer
75 User's address field
76 User's address field
80 Connection line
81 First sub-connection line
82 Second sub-connection line
83 Third sub-connection line
84 First user's address connection line
85 Second user's address connection line
90 Main storage layer of a database
91 Retrieve the first basic code of the user's address data.
92 Search for the corresponding column position to the basic code.
93 Store user's address data.
94 Move along the connection line of the field of the basic code to the assigned sub-storage layer.
95 Determine whether the last basic code of the address data has been reached.
96 Retrieve the next basic code.
97 Retrieve a complete user's address data according to the field of the user's address connected to the user's address connection line.

What is claimed is:

1. A data base structure for use in a network to provide an addressable communication among a plurality of users of the network, each having an address, comprising:
    a plurality of fields for storing basic codes of a user's address;
    a main storage layer having said plurality of fields;
    a plurality of sub-storage layers having said plurality of fields;
    a plurality of user's address fields;
    a plurality of main connection lines each for connecting said main storage layer to one of said sub-storage layers;
    a plurality of sub-connection lines each for forming a connection between two of said sub-storage layers; and
    a plurality of user's address connection lines each for connecting a sub-storage layer to at least one of said user's address fields;
    whereby within such database structure, starting from said main storage layer and extending through said main connection lines and sub-connection lines to said sub-storage layers, the address of a user within said network is efficiently retrieved by said user's address connection lines.

2. The database structure as claimed in claim 1, wherein the starting points of said plurality of main connection lines are respectively each of the fields in said main storage layer.

3. The database structure as claimed in claim 1, wherein each of said main connection lines is connected to one sub-storage layer.

4. The database structure as claimed in claim 1, wherein the starting points of said plurality of sub-storage layers are respectively each of the fields in an upper sub-storage layer.

5. The database structure as claimed in claim 1, wherein each of said sub-connection lines is connected to only one next sub-storage layer.

6. The database structure as claimed in claim 1, wherein the starting points of said plurality of user's address connection lines are respectively each of the fields in the last sub-storage layer.

7. The database structure as claimed in claim 1, further comprising a plurality of searching pointers among a plurality of user's addresses so as to conduct a search from the present field of a user's address for the next or previous user's address data.

8. A method of constructing a database for network users, comprising the following steps:
    (a) checking from a main storage layer whether the main storage layer has a basic code identical to the first bit of the user's address data; if not, placing said basic code in the corresponding field of a plurality of fields of said main storage layer; placing a main connection line and a sub-storage layer connected thereto; and if present, following said main connection line of the field to the sub-storage layer connected thereto;

(b) checking whether said sub-storage layer stores the next basic code of the user's address data; if not, placing said basic code in the corresponding field of the plurality of fields of the sub-storage layer; at the corresponding field, producing a sub-connection line and a sub-storage layer connected thereto; if present, then following said sub-connection line to which the fields is connected, to said sub-storage layer;

(c) repeating step (b) until all basic codes of the user's address data are stored in the database;

(d) according to the field of the last basic code of the user's address data, producing a user's address connection line connected to the user's address field and storing said user's address data in the user's address field;

by means of the above procedure, a complete database for network users being established; and in retrieval of the user's address data, starting from said main storage layer along said main connection lines and sub-connection lines to the last sub-storage layer, a user's address being retrieved via the connection line.

9. The method as claimed in claim 8, wherein said main storage layer has at least one main connection line connected to the plurality of sub-storage layers.

10. The method as claimed in claim 8, wherein said sub-storage layer has at least one sub-connection line connected to the next layer of the plurality of sub-storage layers.

11. The method as claimed in claim 8, wherein the step (d) further comprises the step of producing a plurality of searching pointers between two user's address fields so as to search from the present address field for a next or previous address data of the user.

* * * * *